O. L. BRUCE AND E. AZE.
VULCANIZING CORE.
APPLICATION FILED JULY 14, 1921.

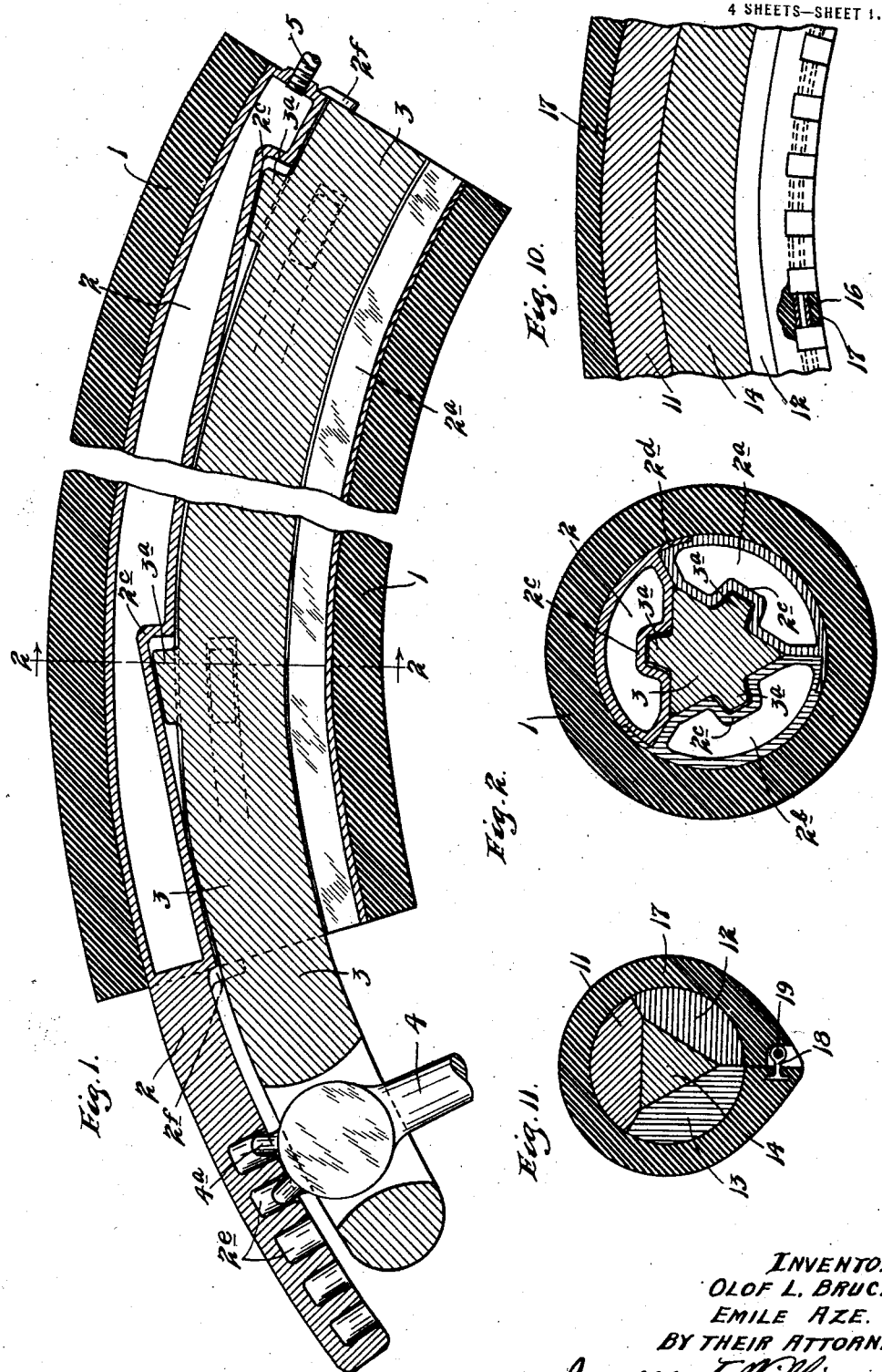

1,408,980.

Patented Mar. 7, 1922.
4 SHEETS—SHEET 2.

INVENTORS.
OLOF L. BRUCE.
EMILE AZE.
BY THEIR ATTORNEY.
James F. Williamson

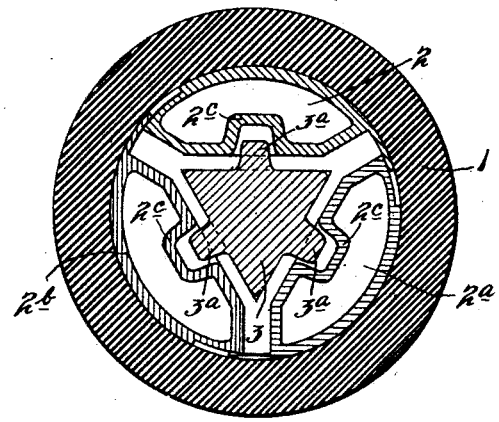
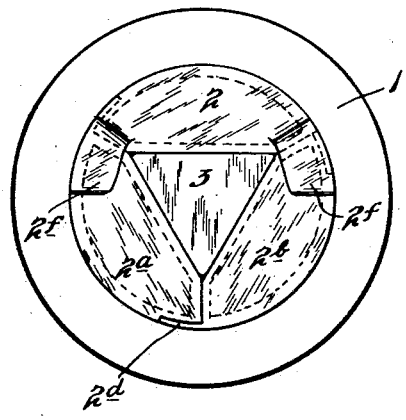
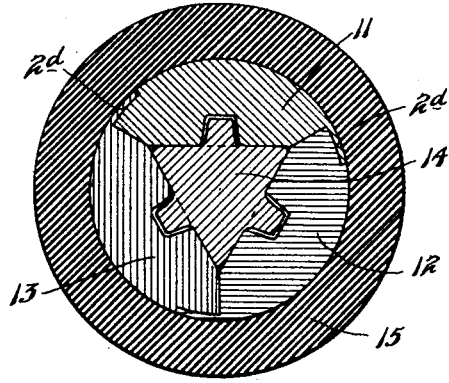
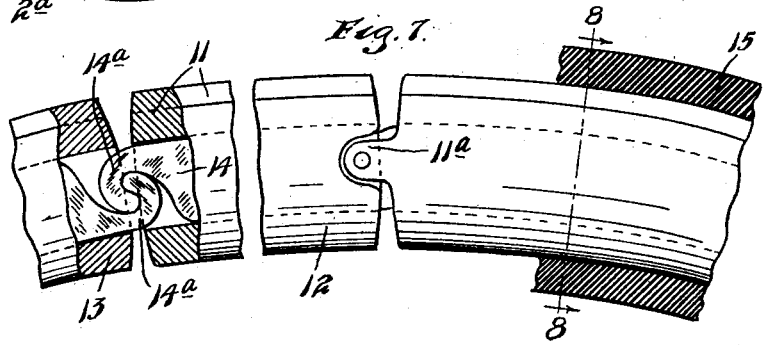

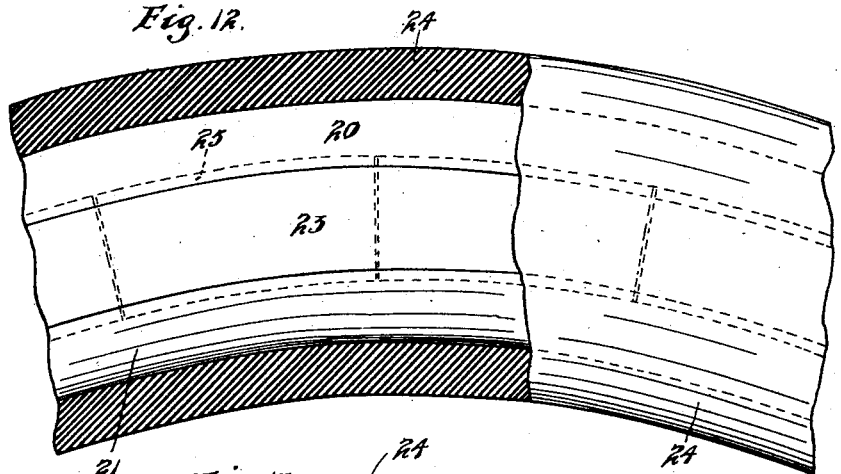
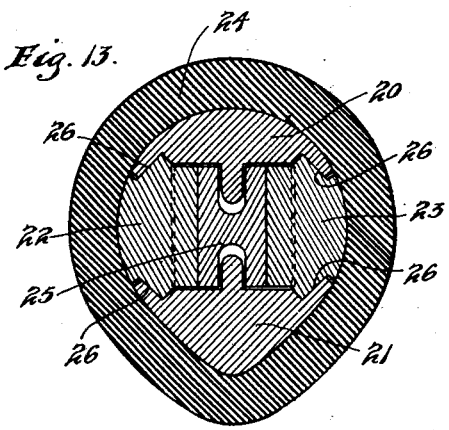
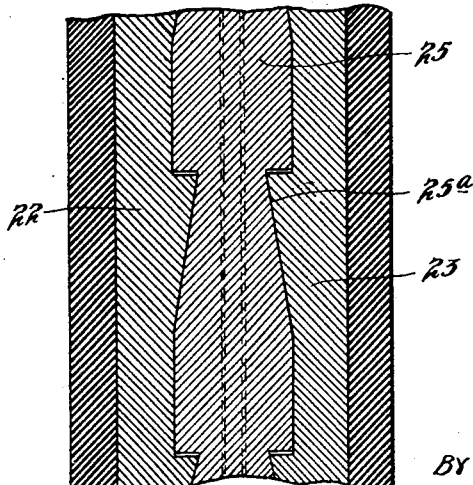

UNITED STATES PATENT OFFICE.

OLOF L. BRUCE AND EMILE AZE, OF MINNEAPOLIS, MINNESOTA.

VULCANIZING CORE.

1,408,980. Specification of Letters Patent. Patented Mar. 7, 1922.

Application filed July 14, 1921. Serial No. 484,706.

*To all whom it may concern:*

Be it known that we, OLOF L. BRUCE and EMILE AZE, citizens of the United States, residing at Minneapolis, in the county of Hennepin and State of Minnesota, have invented certain new and useful Improvements in Vulcanizing Cores; and we do hereby declare the following to be a full, clear, and exact description of the invention, such as will enable others skilled in the art to which it appertains to make and use the same.

This invention relates to a vulcanizing core of the type adapted to be placed in a tire casing or other article to hold the same in firm expanded position during the vulcanizing process.

It is an object of this invention to provide such a core comprising a plurality of substantially segmental members surrounded by an expansible sleeve together with means for moving said members to expand said sleeve. It is a further object of the invention to provide the expanding means with wedges which contact the segmental members and move the same in a substantially radial direction.

It is still another object of the invention to construct a core in which the said segmental members are arranged to receive heating means. It is a still further object of the invention to construct such a core comprising a plurality of hinged sections.

These and further objects and advantages of the invention will be apparent from the following description made in connection with the accompanying drawings in which like reference characters refer to the same parts throughout the different views and, in which—

Fig. 1 is a central longitudinal section of the device;

Fig. 2 is a transverse radial section taken on line 2—2 of Fig. 1;

Fig. 6 is a view similar to Fig. 2 showing the device in expanded position;

Fig. 7 is a view of a modified form of a device;

Fig. 8 is a section on an enlarged scale taken on line 8—8 of Fig. 7;

Fig. 9 is a view in elevation of the device shown in Fig. 1;

Fig. 10 is a longitudinal section of a modification;

Fig. 11 is a radial section of Fig. 10;

Fig. 12 is a view in side elevation and longitudinal section of a modification; and Figs. 13 and 14 are respectively, a radial and horizontal section of such modification.

Figure 3:
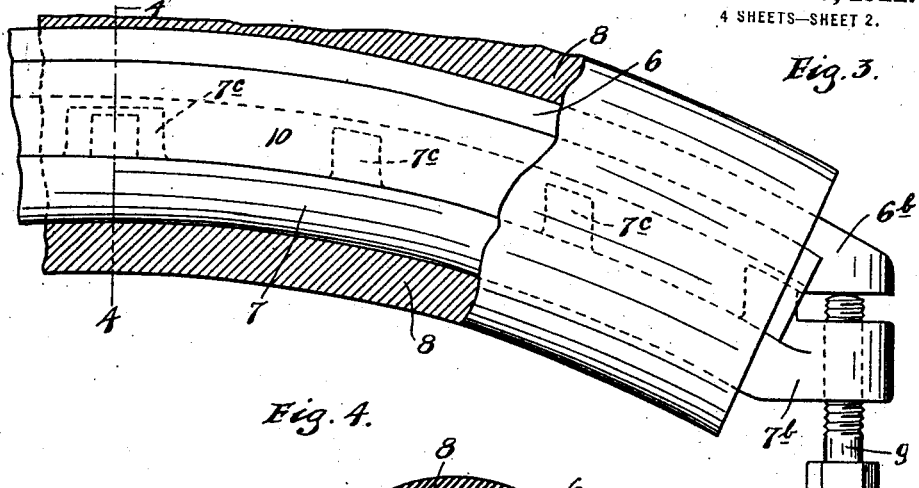
Fig. 3 is a view in side elevation partly in section of a modified form of the device.

Referring to the drawings, in Fig. 1 is shown a device comprising a cylindrical sleeve 1 which is of rubber or other resilient material surrounding a core comprising a plurality of substantially segmental members 2, $2^a$, and $2^b$.

The segmental members are cored to provide chambers therein and on their flat inner surfaces are formed with inclines $2^c$. The segmental members are also provided with straight contacting surfaces adjacent their outer portions and with flanges $2^d$ projecting from one edge thereof and adapted to seat in recesses formed in the outer edges of the adjacent segmental members. A member 3, triangular in cross-section, is enclosed by the segmental members and like the same and the sleeve, is formed on substantially the arc of a circle. The member 3 is provided on each side with a series of projecting wedges $3^a$ adapted to contact with the surfaces $2^c$ and a segmental member 2 projects at one end of the sleeve 1 to form a long lug, in the inner surfaces of which are arranged spaced holes $2^e$. The member 2 is also provided with inwardly extended lugs $2^f$, adapted to contact the ends of the members $2^a$ and $2^b$. The member 3 also extends beyond the end of the sleeve 1 and near its outer end is provided with quite a large aperture therethrough and a handled member 4 having a substantially cylindrical head at one end from which project radial teeth or lugs $4^a$ is adapted to be received in said aperture so that said lugs take into the openings $2^e$. The member 4 can thus be used as a lever or ratchet bar and be used to draw the member 3 longitudinally relative to the segmental members. The segmental member 2, $2^a$ and $2^b$ may be provided at their end portions with threaded openings through which pipes 5 may extend to furnish a heating medium.

In operation, the device will be disposed in the casing and will substantially fit the same. The ratchet bar 4 will then be used to cause relative longitudinal movement between the members 3 and the segmental members and the latter will be moved outwardly radially, as indicated in Fig. 6, by the engagement of the wedged members $3^a$ and $2^c$. The stops $2^f$ on the end of the segmental member 2 will prevent lengthwise movement of the other segmental members. If desired, steam or electrical heating means may be used in the segmental members 3 to furnish heat to the sleeve 1. The sleeve 1, of course, will be expanded by the radial movement of the segmental members and said sleeve will thus be made to tightly fit and expand the casing or article to be vulcanized. It will also be understood that any desired or suitable means may be used to cause the relative longitudinal movement between the members 3 and 2, as for instance, the end of the member 3 might be provided with threads and a nut be placed on the end of the member 2 to be rotated in engagement with said threads.

Figure 4:
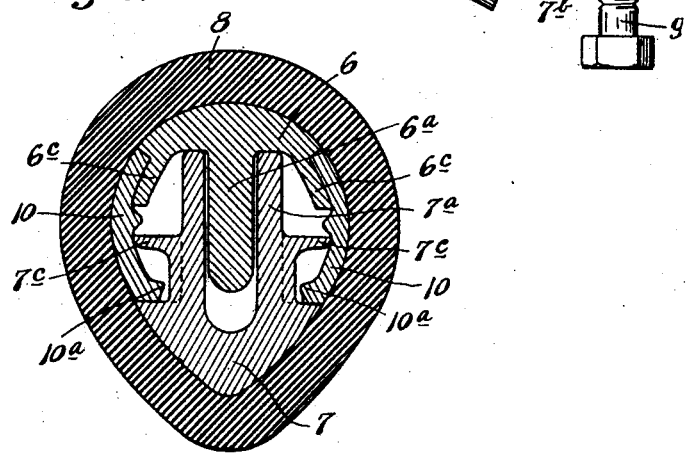
Fig. 4 is a section taken on line 4—4 of Fig. 3.
Figure 5:
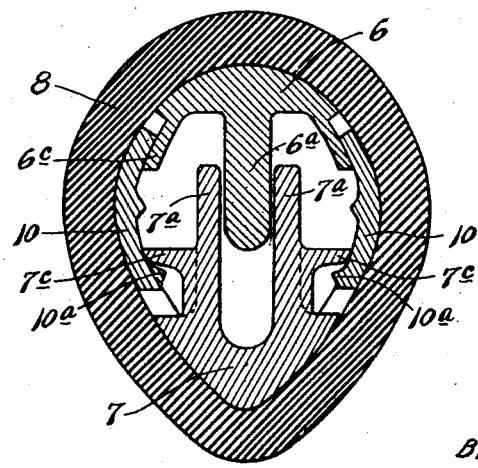
Fig. 5 is a section similar to Fig. 4 showing the device expanded.

In the modification shown in Figs. 3 to 5, two members 6 and 7 are provided which will be shaped at their outer surfaces to substantially the size of a tire casing and these members are arcuate in shape longitudinally being formed substantially on the arc of a circle. Member 6 has a central inwardly projecting rib $6^a$ adapted to be received in and substantially fill the slot or recess formed between the spaced ribs $7^a$ on the member 7. The members 6 and 7 are surrounded by a resilient sleeve 8, also formed in cross-section to substantially the shape of a tire casing and being also longitudinally arcuate in shape. The member 6 projects at each end of the sleeve 8 to form a lug $6^b$ provided with a substantially horizontal flat inner surface and the member 7 also projects at both ends of the sleeve 8 to form a lug $7^b$ disposed in alinement with the lug $6^b$ and formed with substantially horizontal flat inner and outer surfaces. Screws 9 extend through lugs $7^b$ into contact with the flat surfaces of lugs $6^b$. The member 6 is formed at each side with inwardly projecting curved flanges $6^c$ and members 10 are disposed at each side of said member and are co-extensive in length with the sleeve 8 being also arcuate in shape to conform to the contour of the members 7 and 8. The members 10 are provided with curved outer surfaces which surfaces cooperate with the outer surfaces of members 6 and 7 to form a substantially curved surface, the side edges of the members 10 abutting the flat surfaces on the members 6 and 7, as clearly shown in Fig. 4. The members $7^a$ are provided with spaced projections $7^c$. Those projections are adapted to contact with the inner surfaces of the members on plates 10. The plates 10 are provided at their ends adjacent the members 7 with inwardly projecting portions $10^a$.

In the operation of the device, it will be placed in the member to be vulcanized and be of a size to substantially fit the same. Screws 9 will then be turned and the members 6 and 7 will be forced apart. The plates 10 will slide on the flanges $6^c$ and over the projections $7^c$ and those plates will thus be also moved outwardly owing to the wedge action of these members. The projections $7^c$ will also act to cause the plates 10 to move relatively to the members 6. The sleeve 8 will thus be expanded to tightly fit and expand the member to be vulcanized. It will be noted that a recess is formed between the sides of the ribs $7^a$ and the member $6^a$, in which electrical or other heating means may be disposed to heat the core, should this be desired.

In the modification shown in Figs. 6 to 9, the segmental sections 11, 12 and 13 are shown which are quite similar to the segmental sections 2, $2^a$ and $2^b$ of Figs. 1 to 3, except that said sections are not provided with the interior chambers. In this modification, however, the core comprises a plurality of hinged sections. The segmental members being hinged together at their ends by projecting ears $11^a$ received in sockets formed in the ends of the adjacent segmental members, the parts being connected by suitable pivot pins. The central expanding wedge member 14 is also formed of hinged sections being formed at the ends into hooks $14^a$ which are inter-engaged. The sleeve 15 is also divided into sections slightly spaced at the ends to permit the hinged movement. Such a core could be used to extend to considerable distance around the tire casing, to expand the same during the vulcanizing process.

In the modification shown in Figs. 12 and 14, segmental members 20, 21, 22 and 23 are arranged to form a core having a continuous curved surface, which core is disposed inside of the sleeve 24. A wedge member 25 is enclosed between said segmental members. This wedge member is notched to form wedge or inclined surfaces $25^a$ on its sides which correspond with similar notched and inclined surfaces on the lateral segmental members 22 and 23, so that when the member 25 and the members 22 and 23 are relatively moved, the latter members will be separated. The member 25 will be projected at one end of the sleeve, as is member 3 shown in Fig. 1 and will be arranged to be longitudinally moved relatively to the members 22 and 23. As shown in Fig. 13, the members 22 and 23 are arranged at top and bottom with inclined surfaces 26 over which extend flanges projecting from the members 20 and 21. It will thus be apparent that when the members 22 and 23 are moved outwardly the inclined surfaces 26 will also force the members 20 and 21 apart and the entire inner core member will thus be expanded and expand the sleeve 24. This sleeve will, of course, be placed in the tire or article to be expanded and vulcanized in a manner, such as above described. The members 20 and 21 are formed with central inwardly projecting ribs engaging in slots formed in the central wedge member 25 and the parts are thus held in proper position.

As shown in Fig. 9, it is also contemplated to make the sleeve member of the core of split or open formation, the open edges being secured together by suitable detachable fasteners. In this form, as shown in Figs. 10 and 11, tubes 16 are secured in an open edge of sleeve 17, and spaced longitudinally. Rings 18 are secured in spaced relation in the abutting edge, and adapted to enter between the ends of tubes 16. A rod or wire 19 is then run through the rings or tubes to lock the sleeve 17 closed. By using the open sleeves, several of the same of different diameters can be used with one central expanding member and adapted for different diameters of tire casings. As shown in Fig. 10, the outer circumference of such sleeves may not be concentric with the outer edge of the expanding member.

It will, of course, be understood that various changes may be made in the form, details and arrangement of the device without departing from the scope of applicants' invention which, generally stated, consists in the matter shown and described and set forth in the appended claims.

What is claimed is:

1. A vulcanizing core comprising an expansible resilient sleeve and expanding means for the same comprising a plurality of radial movable segmental members of arcuate shape longitudinally and a member slidable longitudinally between said members and comprising wedge means for moving said segmental member radially.

2. A vulcanizing core comprising an expansible resilient sleeve and expanding means for the same, comprising a plurality of radially movable members shaped to form a core and means for moving said members relatively radially comprising wedge members.

3. A vulcanizing core comprising an expansible arcuate shaped resilient sleeve and expanding means for the same, comprising a plurality of contacting segmental members, also arcuate in shape longitudinally, said members arranged to form a substantially cylindrical member and an arcuate wedged member longitudinally movable between said segmental members to move the same radially outward.

4. The structure set forth in claim 4, said segmental members being formed with recesses adapted to receive heating means.

5. The structure set forth in claim 4, said segmental members being formed with overlapping flanges.

6. A vulcanizing device comprising an expansible resilient sleeve longitudinally arcuate in shape and an expanding core member therein comprising a plurality of radially movable segmental members, having inclined surfaces on their inner sides, and a longitudinally movable member enclosed by said segmental members and having wedges thereon contacting with said inclined surfaces to move the segmental members radially outward and means for moving said wedged member longitudinally to expand said segmental members.

7. A vulcanizing core comprising a plurality separate expansible sleeve sections and an expanding member therefor comprising a plurality of sections corresponding to the sleeve sections and hinged together.

8. A vulcanizing core comprising a plurality of hinged sections, each section consisting of a sleeve and an expanding means comprising longitudinally arcuate segmental members and wedge means for separating the same.

9. A vulcanizing core comprising a resilient sleeve split along one longitudinal edge, detachable fastening means for holding said sleeve in closed position and an expanding means in said sleeve."

10. A vulcanizing core having in combination, a longitudinally arcuate sleeve longitudinally split, an arcuate expanding member enclosed thereby, the outer surface of said sleeve being eccentric to the outer surface of the expanding member.

11. A vulcanizing core having in combination a longitudinally arcuate sleeve split along a longitudinal line, a longitudinal arcuate expanding member enclosed thereby, the outer longitudinal surface of said sleeve being eccentric to the outer longitudinal surface of the expanding member.

12. A vulcanizing core comprising an expansible resilient sleeve of rubber having a continuous periphery, and expanding means therein comprising a plurality of relatively movable members.

In testimony whereof we affix our signatures.

OLOF L. BRUCE.
EMILE AZE.